Patented Mar. 27, 1934

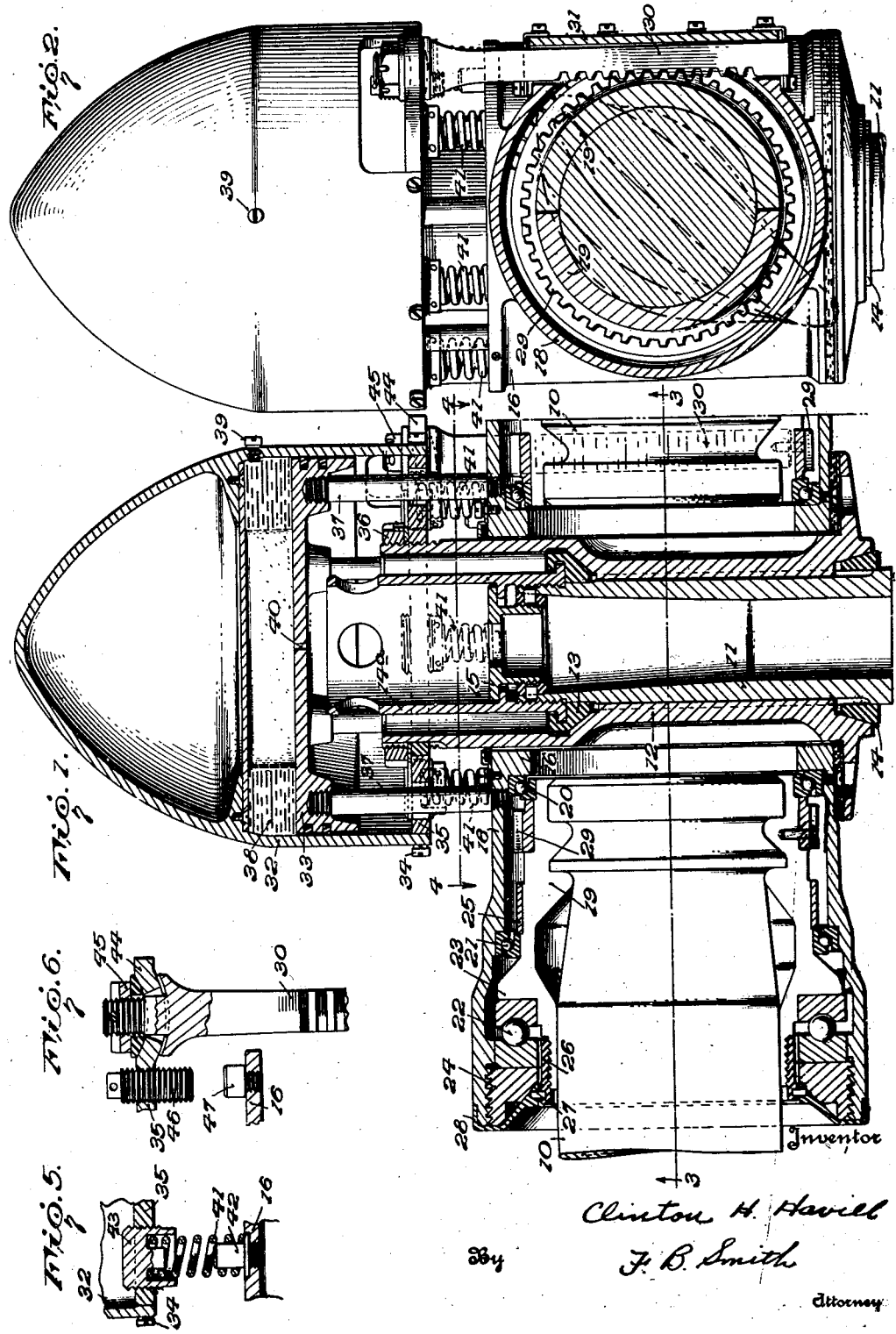

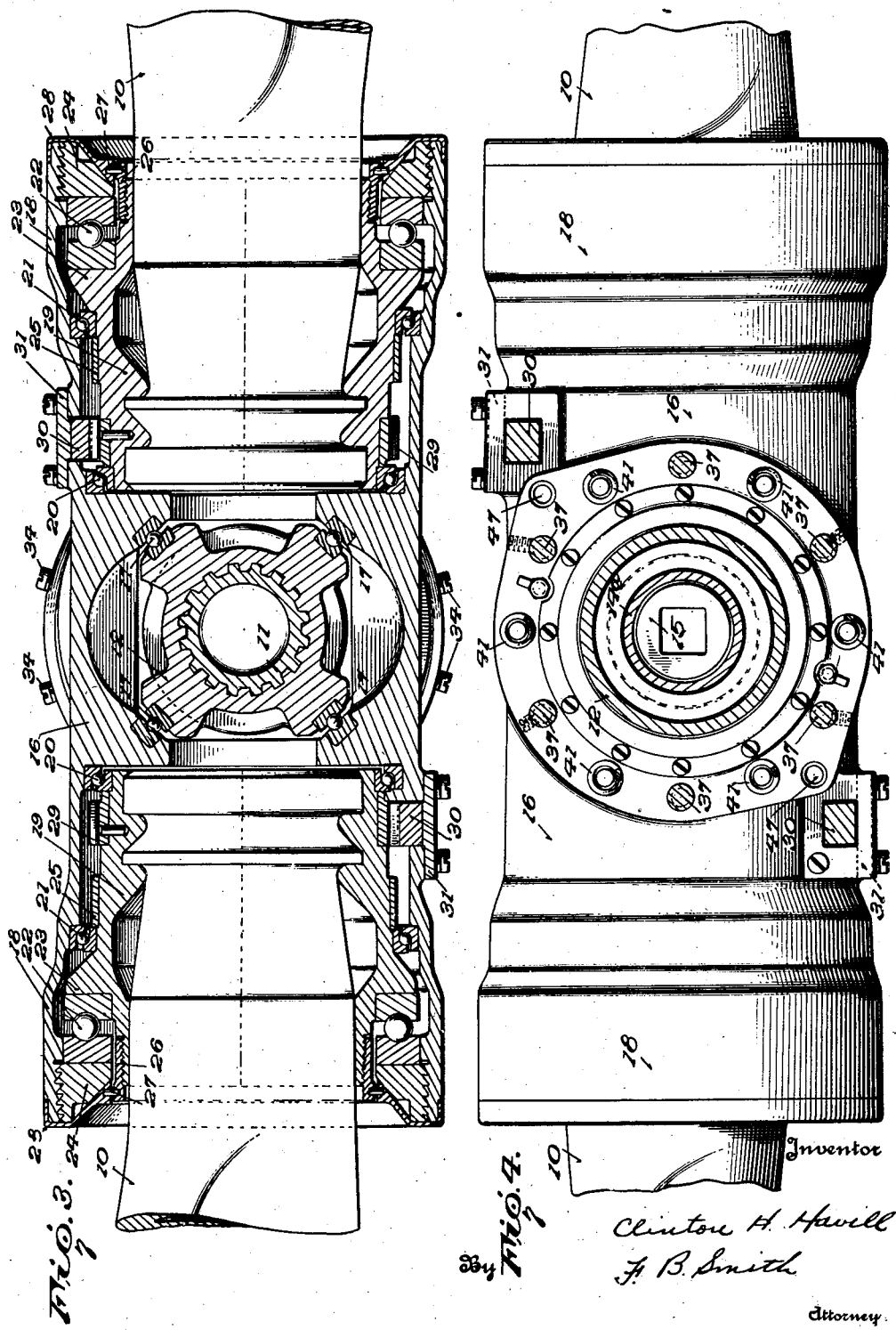

1,952,800

UNITED STATES PATENT OFFICE 1,952,800

AUTOMATIC PROPELLER

Clinton H. Havill, South Orange, N. J., assignor to Eclipse Aviation Corporation, East Orange, N. J., a corporation of New Jersey Application July 11, 1930, Serial No. 467,316

22 Claims. (Cl. 170—162)

This invention relates to propellers and more particularly to an aircraft propeller having a plurality of blades the pitch of which may be varied while the propeller is in operation.

There have heretofore been proposed, propellers having blades rotatable about their axes to vary the pitch, such propellers, especially in the case of aircraft installations, possessing marked advantages over the type wherein the pitch of the blades is fixed or otherwise non-controllable during operation. Various means have been devised whereby such pitch-variation may be accomplished, but most of these means have been manually or power operated and the extent of the change in pitch was dependent upon the skill of the operator. In order to eliminate the possibility of the pitch of the blades being adjusted to an erroneous value it has also been proposed to vary the pitch in an automatic manner, by employing the effect of one or more of the various forces developed by the propeller during operation. In operation of propellers of the variable-pitch type, it is highly desirable to provide some means for counteracting or balancing the torsion on the blades which force tends to constantly reduce the pitch of the blades.

It is accordingly one of the objects of the present invention to provide in a propeller having a plurality of blades, novel means for varying the pitch thereof together with novel means for substantially neutralizing the effect of torsion thereon.

Another object of the present invention is to provide a propeller wherein the pitch of the blades may be varied in a novel, simple and efficient manner and wherein the pitch-varying means is also effective to overcome the effect of torsion on the blades.

Still another object is to provide a propeller wherein novel means employing the thrust and centrifugal forces generated during operation may be utilized for securing pitch variation.

A further object is to provide in a propeller of the variable pitch type, novel means including a body of fluid the pressure of which is dependent upon the speed of rotation of the propeller, for maintaining said speed substantially constant, for a given input power.

A still further object is to provide a propeller of the variable pitch type wherein a novel combination and arrangement of elements is employed in order to obtain automatic adjustment of the pitch of the propeller blades in a manner to secure maximum propeller efficiency at all times and simultaneously therewith to keep the speed of rotation of the propeller substantially constant in order that the engine driving the propeller may operate at maximum efficiency.

Other objects and novel features of the invention will appear more fully hereinafter in the following detailed description when taken in connection with the accompanying drawings which are illustrative of one form of the invention. However, it is to be expressly understood that the drawings are for purposes of illustration only, and are not designed as a definition of the limits of the invention, reference being had for this purpose to the appended claims.

In the drawings, wherein similar reference characters refer to like parts throughout the several views;

Fig. 1 is a horizontal section of a portion of a propeller embodying the present invention;

Fig. 2 is a side view partly in section of the propeller;

Fig. 3 is a sectional end view taken on line 3—3 of Fig. 1;

Fig. 4 is an end view partly in section of the parts shown in Fig. 1 and taken on line 4—4 of Fig. 1; and Figs. 5 and 6 are detail views in section of some of the parts illustrated in Fig. 1.

Referring more particularly to Figs. 1 and 3, a propeller embodying the principles of the present invention is illustrated therein as comprising a plurality of blades 10 adapted to be driven in any suitable manner from a splined drive shaft 11 which latter may be, in the case of aircraft installations, the crankshaft of the usual internal combustion engine. As shown in Fig. 2, the blades 10 are of aerofoil section and so constructed that the center of gravity of each section is preferably coincident with the axis of rotation of the blade in order to reduce vibration.

In order to drivably connect the blades 10 to the shaft 11, a splined driving block 12 encircling said shaft is employed, said block being firmly secured in driving relation therewith as by means of split front and rear cones 13 and 14 respectively which are adapted to be forced into firm engagement with suitable beveled faces of the block by means of a nut 14ª threadedly received by the outer extremity of the driven shaft 11. If desired, suitable locking means such as for example, lock nut 15 may be utilized for securely maintaining the nut 14 in position after assembly. A main hub forging 16, drivably connected to and surrounding the block 12, is provided for supporting the propeller blades 10, and these parts are so constructed that the hub forging is axially movable with respect to the driving block, a plurality of rows of bearings 17, Fig. 3, arranged parallel to the axis of shaft 11 being interposed between these two members in order to facilitate this movement.

The hub member 16 is preferably formed in such a manner as to rotatably support the root ends of the blades 10 to the end that the blades may be capable of rotation about their longitudinal axes to vary the pitch. In the form shown, the hub is provided with a pair of axially aligned sockets or sleeves 18 adapted to receive the root ends of blades 10, the latter being provided with split root housings 19. Interposed between the root housing and the socket there are provided ball bearings 20 and 21 there being also provided a ball thrust bearing 22 confined between a shoulder 23 formed integrally with the housing 19, and a retaining nut 24, the latter serving the purpose of maintaining the blades in proper position within each socket. The two halves of the root housing after being fitted over the root ends of each of the blades may be secured in position by clamping rings 25 and 26 and, if desired, an oil sealing ring 27, adapted to cooperate with ring 26, and a locking member 28 may be employed in order to prevent seepage of oil or grease from the bearing 22.

In the form shown, during operation of the propeller, the forward thrust exerted by the blades 10 is employed in part for changing the pitch. To accomplish this, the root ends of each of the blades are provided with ring gears 29, fixed thereon in any suitable manner and adapted to cooperate with relatively stationary toothed racks 30, connected to the driving block 12 in a manner which will appear more fully hereinafter. Suitable openings may be provided in sleeves 18 for the reception of these racks and cover plates 31 may be employed for closing these openings if desired. It will be understood from the above, that during operation, the thrust of the propeller blades and the torsion thereon due to centrifugal force will cause the hub assembly to move forwardly of the driving block and shaft and that during such movement the ring gears 29 will travel along the relatively stationary racks 30 to rotate the blades in their sockets and thus vary the pitch.

Centrifugally operated means coacting with the above-described thrust-responsive means are also provided for controlling the pitch of the propeller blades and the operation of the first named means is of such character that the same may act conjointly with the second named means to adjust the pitch of the blades to such a position that the speed of the engine driving the propeller will be maintained substantially constant during variable flight conditions, if desired. To this end, the centrifugally operated means is preferably arranged to yieldingly oppose the thrust-responsive movement of the propeller hub and is disposed concentrically with respect to the drive shaft and includes a cylinder 32 and movable piston 33. In order to permit relative movement between these two parts to control the position of the hub and consequently the pitch of the blades, the cylinder is fastened as by means of screws 34 to a plate 35 secured and locked by a nut 36 to the forward extremity of the driving block 12, while the piston is connected to the hub 16 by means of a plurality of rods 37 symmetrically positioned about the axis of the drive shaft. A suitable working fluid 38, such as for example, mercury, is placed within the cylinder through a suitable opening which may be closed by a screw 39, during assembly of the propeller.

The piston 33 is provided with a vent opening 40 and the parts may be so proportioned and the amount of fluid in the cylinder so gauged that the fluid will occupy less than half of the available space in the cylinder thereby eliminating the possibility of any of the working fluid being lost by passage through the vent 40, it being understood that when the propeller is not in use, the plane of the piston will be substantially horizontal. In operation, the fluid will occupy the position shown in Fig. 1 during all conditions of flight, even when an aircraft equipped with the invention is in a steep climb, it being understood that centrifugal force acting upon the liquid will overcome the force of gravity thereon at a relatively low rate of revolution. If desired, in order to increase the aero-dynamical efficiency of the propeller, the cylinder 32 may be provided with a stream-lined nose as shown in Fig. 1.

Resilient means are interposed between the plate 35 and the hub 16 and operate conjointly with the centrifugally operated means above described to yieldingly resist forward movement of the hub. As shown, such means may comprise a plurality of springs 41 arranged concentrically with respect to the driving shaft, one end of each of these springs encircling a pin or stud 42 in hub member 16, Fig. 5, while the other end is fitted within the hollow portion of a screw cap 43 the latter being adjustable with respect to the plate 35 in order to vary the tension of said springs. Any suitable locking means may be provided for locking the cap in position after the desired adjustment has been made. It is here pointed out that these springs normally, when the propeller is at rest, maintain the propeller hub in a rearward position wherein the pitch of the blades is a maximum, this angle being experimentally or theoretically predetermined for any given condition, such as, for example, a cruising condition.

It will be seen from the above that if the springs 41 are designed to yieldably oppose the thrust of the blades and the centrifugally-responsive means are designed to neutralize the torsion on the blades, the variation of pitch can be made to depend on thrust alone. However, it is to be noted that this same structure may be adjusted to operate in response to torsion alone, if desired, by merely reducing the magnitude of the springs 41 and increasing the amount of liquid in the chamber or cylinder 32. The area of piston 33 may also be varied if necessary.

The outer ends of each of the two racks 30 are carried by an extension 44 of plate 35, this extension preferably being cupped or dished, Fig. 6, in order to permit a slight amount of pivotal adjustment of the rack. A suitable nut 45 threaded on the outer extremity of the rack serves to fixedly secure the same in adjusted position. Adjacent the extensions 44 there is provided an adjustable stop member 46 adapted to cooperate with a stop 47, Figs. 4 and 6, carried by the hub 16 in order to positively limit forward movement of the hub, and consequently serving to predetermine the minimum pitch of the blades. The maximum pitch of the blades is predetermined by movement of the hub, downwardly, as viewed in Fig. 1, which is limited by the flanged portion of the driving block 12 below the hub, as viewed in this figure.

During operation of a propeller embodying the present invention, which may be advantageously employed in aircraft, for example, rotation of the shaft 11, by operation of the aircraft engine will rotate the propeller blades 10 through the drivable connections established through the hub 16, driving block 12 and the shaft 11. As heretofore pointed out, the tension of the springs 41 may be such that the hub 16 is normally maintained in its extreme rearward position wherein the pitch of the blades is a predetermined maximum. Assuming that it is desired to operate the aircraft engine at full throttle, that is, the engine is supplied with a maximum amount of fuel so that it operates at a relatively high speed in order to deliver the maximum rated energy output for which it is designed, which condition is especially advantageous in the case of racing aeroplanes, and assuming also that the aircraft is at rest, it will be seen that as the engine speed increases, the thrust generated by the propeller blades and the torsion thereon will also increase and will be effective to move the hub 16 forwardly against the tension of springs 40 to decrease the pitch of the blades. It is here pointed out that the net torsion on efficient propeller blades is the algebraic sum of the torsion due to centrifugal force and that due to aero-dynamic force, the former tending to reduce the pitch while the latter tends to increase the pitch. However, since the first named component is the larger, the net effect will be to move the hub 16 forwardly to reduce the pitch of the blades. This change of pitch is accomplished by the co-operation between the ring gears 29, carried by the root ends of each of the blades and the relatively stationary racks 30 operatively connected to the driving block 12.

As the pitch of the blades decreases, in the case of a properly designed propeller, the load on the engine will decrease by reason of the increased slip of the propeller and as a consequence thereof, the speed of the engine and propeller will tend to increase. However, the centrifugal force developed during rotation of the propeller and acting on the fluid 38, will cause the latter to assume a position in the cylinder 32, such as that indicated in Fig. 1, centrifugal force also storing in the fluid a hydrostatic pressure which will be effective through the piston 33 and rods 37 connecting said piston to the propeller hub to force the latter rearwardly, this force then operating in opposition to the thrust-responsive forward movement of the hub. Since the hydrostatic pressure of the working fluid varies as the square of the rate of revolutions of the propeller, it will be understood that the force with which the piston 33 opposes the forward movement of the hub will also vary directly as the rate of revolutions or speed of the propeller. Hence, as the speed of the propeller tends to increase in response to the decreased pitch, hydrostatic pressure will tend to move the hub rearwardly to increase the pitch and thus keep the load on the engine substantially constant whereby the speed of the same and of the propeller will also be substantially constant.

As heretofore pointed out, if the centrifugally-responsive means are adjusted to neutralize the torsion on the blades, then the springs may be designed to yieldably oppose the thrust-responsive movement of the hub, which design is particularly advantageous in aircraft installations wherein maximum efficiency is desired, for example, during cruising operation.

There has thus been provided in a propeller having a plurality of blades, novel means utilizing a balance between variable forces effective during operation, for varying the pitch of the blades. Such means are automatic in operation, and are so constructed and arranged that the angularity of the blades is maintained at a value such that the propeller and engine driving means therefor will both operate at maximum efficiency during variations in air speed and other variable factors. As will be understood, the force available for varying the pitch is substantially the resultant of the opposed forces due to thrust and centrifugal force, and either of these two may be regulated and adjusted to any desired value, by respectively varying the tension of springs 41 or changing the amount of liquid within the cylinder 32.

While there has been illustrated and described only one embodiment of the present invention, it is to be expressly understood that the same is not limited thereto but may be embodied in various forms as will now be apparent to those skilled in the art without departing from the spirit of the invention. Reference will therefore be had to the appended claims for a definition of the limits of the invention.

What is claimed is:

1. A device of the class described comprising a hub, a plurality of blades carried thereby, a rotatable driving shaft, means for drivably connecting said shaft and hub, said hub being movable axially of said shaft in one direction in accordance with the thrust of the blades, means operable during such movement to decrease the pitch of said blades and other means responsive to centrifugal force and tending to move the hub axially of the shaft in the opposite direction to increase the pitch of the blades to maintain the speed of said rotatable shaft substantially constant for a given power input.

2. A propeller for aircraft comprising a plurality of blades, means for rotating said blades, means responsive to the thrust and torsion of the blades for changing the pitch of the latter, resilient means for yieldingly resisting operation of said second named means, and other means including a centrifugally operable device cooperating with said second named means for partially compensating for the force of centrifugal torsion of the blades.

3. A propeller for aircraft comprising a plurality of blades, means for rotating said blades, means responsive to the thrust of the blades and including a longitudinally movable member for changing the pitch of said blades, and other means responsive to centrifugal force and cooperating with said member for predetermining the lower pitch angle of said blades.

4. A propeller for aircraft comprising a plurality of blades, means for rotating said blades, means responsive to the thrust of the blades and including a longitudinally movable member for changing the pitch of said blades, resilient means for yieldingly resisting thrust-responsive movement of said member, and other means cooperating with said member and including a centrifugally operable device for predetermining the lower pitch angle of said blades.

5. In an aircraft propeller having a plurality of blades, means for rotating the blades, means including a member movable in one direction for automatically varying the pitch of the blades during rotation thereof and centrifugally-actuated means including a member movable in the opposite direction and cooperating with the pitch-varying means for limiting movement of the latter in order to maintain the rate of rotation of the blades substantially constant.

6. In combination, a rotatable drive shaft, a hub drivably connected with said drive shaft, a plurality of blades carried by the hub, said hub being axially movable with respect to the shaft in response to the thrust exerted by said blades, means operable during axial movement of the hub for varying the pitch of the blades and fluid pressure means dependent on centrifugal force for controlling the axial movement of the hub.

7. In combination, a rotatable drive shaft, a plurality of blades, means for drivably connecting said shaft and blades, means responsive to the thrust of the blades for varying the pitch thereof, and fluid-actuated means responsive to centrifugal force for yieldably opposing the operation of said pitch varying means.

8. A propeller having a plurality of blades, a shaft, means longitudinally movable with respect to said shaft for drivably connecting the shaft and blades, means operable during such longitudinal movement for varying the pitch of the blades, resilient means for yieldably opposing such longitudinal movement, and fluid means actuated by centrifugal force for controlling such longitudinal movement.

9. A propeller having a plurality of blades, a hub, means for driving said hub, means for rotatably mounting said blades in said hub, means responsive to the thrust of said blades for moving said hub axially of said shaft, means cooperating with said blades for changing the pitch thereof during such axial movement and fluid-actuated means responsive to centrifugal force for opposing the thrust-responsive movement of the hub.

10. In combination with a rotatable shaft, a hub axially movable with respect to said shaft, a plurality of blades carried by the hub and cooperating with said hub to move the latter axially in response to the thrust of said blades, means operable during such axial movement to vary the pitch of said blades and means responsive to centrifugal force for compensating for the torsion of the blades.

11. A propeller having a plurality of blades, means for rotating said blades, said means including a driving member, a hub longitudinally movable with respect to said driving member, in response to the thrust of said blades, means interconnecting said driving member and blades and operable to vary the pitch of the latter during such longitudinal thrust-responsive movement of the hub, and other means for partially compensating for the centrifugal torsion of said blades.

12. In combination with a rotatable shaft, a hub axially movable with respect to said shaft, said hub having a plurality of radially extending sockets, a propeller blade rotatably mounted in each socket, each of said blades cooperating with the hub to move the latter axially with respect to the shaft in accordance with the thrust of the blades, means yieldably opposing such axial movement, means interconnecting said shaft and blades for rotating the latter in the hub sockets to vary the pitch during such axial movement of the hub, and means responsive to centrifugal force and cooperating with said hub for partially overcoming the torsion of the blades.

13. A propeller having a rotatable shaft, a plurality of blades, a hub drivably connecting said shaft and blades, said hub being movable forwardly of said shaft in accordance with the thrust and torsion of the blades to reduce the pitch of the latter, a plurality of resilient members yieldably opposing forward movement of the hub, and a centrifugally operable device associated with the hub for partially neutralizing the effect of torsion on the blades.

14. A rotatable propeller of the class described comprising a hub, a plurality of blades carried thereby, means for driving said hub, said hub being relatively movable with respect to said driving means in response to the thrust of said blades, relatively stationary means cooperating with said blades during such movement to rotate said blades with respect to the hub to change the pitch, and means controlled by centrifugal force during rotation of said driving means, hub and blades for compensating for the torsion of the blades.

15. An aircraft propeller comprising a hub, a plurality of blades carried by the hub, means for rotating said hub, means for automatically decreasing and increasing the pitch of said blades during operation, and other means responsive to centrifugal force for predetermining the lower pitch angle of said blades.

16. In a propeller comprising a plurality of blades, means responsive to the thrust of said blades to vary the pitch thereof, and means responsive to centrifugal force for predetermining the lower pitch limit of said blades.

17. A propeller for aircraft comprising a blade, means for rotating said blade, a hub movable with respect to said rotating means in response to the thrust of said rotating blade, means including a rack mechanism for changing the pitch of said blade during such movement of the hub, and means movable in response to centrifugal force for neutralizing the torsional moment of said rotating blade.

18. In a propeller having a hub, a plurality of blades rotatably mounted in the hub, a rotatable shaft, means including a plurality of rows of bearings arranged parallel with the axis of said shaft for drivably connecting the hub and shaft, the hub being longitudinally movable of said shaft in response to the thrust of the blades, a plurality of springs arranged between the hub and shaft and forwardly of the hub for yieldably resisting relative movement of the hub and shaft in response to the thrust of the blades, means interconnecting said shaft and blades for varying the pitch of the latter in response to the thrust-responsive movement of the hub, and means governed by centrifugal force for opposing further thrust-respsonsive movement of the hub relative to the shaft at a predetermined speed of rotation of the latter.

19. An automatic variable pitch propeller comprising a rotatable shaft, a hub drivably connected with said shaft, a plurality of blades mounted in said hub, means including said hub for varying the pitch of said blades in accordance with the thrust exerted thereby when the propeller is rotating, resilient means for yieldably opposing a decrease in the pitch of the blades and hydraulically-operated means for controlling the operation of said pitch varying means.

20. In a variable pitch propeller having a rotatable shaft, a hub drivably connected with said shaft, a plurality of blades rotatably mounted in said hub, said hub being axially movable with respect to said shaft in accordance with the thrust exerted by said blades, means interconnecting said blades and shaft for varying the pitch of said blades in response to a thrust-actuated movement of said hub, and hydraulically-operated means for controlling the axial movement of the hub with respect to said shaft.

21. A propeller having a plurality of blades, a shaft, means including a hub movable axially of said shaft in response to the thrust of said blades for varying the pitch of the latter, and centrifugally-responsive means for substantially neutralizing the centrifugal torsion of the blades during operation of the propeller.

22. A propeller for aircraft comprising a hub and a plurality of blades, means for rotating said hub, the latter being axially movable of said means, means for automatically changing the pitch of said blades, said last named means including said hub movable with respect to said rotating means, and fluid pressure means for substantially neutralizing the torsion of said blades.

CLINTON H. HAVILL.